United States Patent
Buford et al.

(10) Patent No.: US 8,300,790 B2
(45) Date of Patent: Oct. 30, 2012

(54) METHOD AND SYSTEM FOR AUTOMATIC CONFERENCE CALL SESSION MIGRATION

(75) Inventors: John F Buford, Princeton, NJ (US); Krishna Kishore Dhara, Dayton, NJ (US); Venkatesh Krishnaswamy, Holmdel, NJ (US); Xiaotao Wu, Edison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 200 days.

(21) Appl. No.: 12/978,896

(22) Filed: Dec. 27, 2010

(65) Prior Publication Data
US 2012/0163577 A1    Jun. 28, 2012

(51) Int. Cl.
*H04M 3/42* (2006.01)

(52) U.S. Cl. .................. 379/204.01; 370/260; 709/204

(58) Field of Classification Search ............. 379/204.01, 379/202.01, 260; 370/260; 709/204
See application file for complete search history.

(56) References Cited

U.S. PATENT DOCUMENTS

| | | | |
|---|---|---|---|
| 5,974,135 A * | 10/1999 | Breneman et al. | 379/265.04 |
| 7,415,522 B2 | 8/2008 | Kaluskar et al. | |
| 7,460,656 B2 * | 12/2008 | Lam | 379/202.01 |
| 7,502,824 B2 | 3/2009 | Kaluskar et al. | |
| 7,552,218 B2 | 6/2009 | Kaluskar et al. | |
| 7,587,400 B2 | 9/2009 | Bastawala et al. | |
| 7,684,417 B2 | 3/2010 | Imai et al. | |
| 7,840,683 B2 | 11/2010 | Zhang | |
| 2003/0031161 A1 | 2/2003 | Froehlich et al. | |
| 2004/0199580 A1 | 10/2004 | Zhakov et al. | |
| 2005/0038848 A1 | 2/2005 | Kaluskar et al. | |
| 2005/0038849 A1 | 2/2005 | Kaluskar et al. | |
| 2006/0036617 A1 | 2/2006 | Bastawala et al. | |
| 2006/0095575 A1 * | 5/2006 | Sureka et al. | 709/227 |
| 2006/0149702 A1 | 7/2006 | Kaluskar et al. | |
| 2006/0245566 A1 | 11/2006 | Parker | |
| 2006/0259628 A1 | 11/2006 | Vadlapudi et al. | |
| 2007/0019631 A1 | 1/2007 | Jang | |
| 2007/0282990 A1 * | 12/2007 | Kumar et al. | 709/223 |
| 2008/0019316 A1 | 1/2008 | Imai | |
| 2008/0059639 A1 | 3/2008 | Zhang | |
| 2008/0069011 A1 | 3/2008 | Sekaran et al. | |
| 2008/0159318 A1 | 7/2008 | Pierlot et al. | |
| 2008/0165945 A1 * | 7/2008 | Vadlakonda et al. | 379/204.01 |
| 2009/0086951 A1 * | 4/2009 | Geppert et al. | 379/204.01 |
| 2009/0086952 A1 * | 4/2009 | Geppert et al. | 379/204.01 |
| 2009/0179983 A1 | 7/2009 | Schindler | |
| 2009/0259758 A1 | 10/2009 | Chen et al. | |
| 2010/0150105 A1 | 6/2010 | Miao et al. | |

(Continued)

OTHER PUBLICATIONS

Koskelainen, et al., "Requirements for Floor Control Protocols", Network Working Group, Request for Coments 4376, Category: Informational, Feb. 2006.

(Continued)

*Primary Examiner* — Creighton Smith (57) ABSTRACT

Disclosed herein are methods, systems, and non-transitory computer-readable storage media for conference call session migration. The conference call session migration includes automatically configuring and establishing a target conference call session during a source conference call session; automatically converting session state and session history from a source format of the source conference call session to a target format of the target conference call session, and automatically connecting per-user clients to the target conference call session. For example, in response to a request from a session manger, the participants on the source conference call session are added to the target conference call session in order to add new media or other conferencing capabilities subject to network and server capabilities, user devices, user conferencing software, user location, user preferences, and policies.

20 Claims, 10 Drawing Sheets

U.S. PATENT DOCUMENTS

2010/0223388 A1    9/2010  Vadlapudi et al.
2010/0272245 A1*  10/2010  Brunson .................... 379/88.11
2011/0305332 A1*  12/2011  Geppert et al. .......... 379/202.01

OTHER PUBLICATIONS

Camarillo, et al., "The Binary Floor Control Protocol (BFCP)", Network Working Group, Request for Comments 4582, Category: Standards Track, Nov. 2006.

Even, et al., "Conferencing Scenarios", Network Working Group, Request for Comments 4597, Category: Informational, Jul. 2006.

Camarillo, et al., Connection Establishment in the Binary Floor Control Protocol (BFCP), Network Working Group, Request for Comments 5018, Category: Standards Track, Sep. 2007.

Barnes, et al., "A Framework for Centralized Conferencing", Network Working Group, Request for Comments 5239, Category: Standards Track, Jun. 2008.

* cited by examiner

METHOD AND SYSTEM FOR AUTOMATIC CONFERENCE CALL SESSION MIGRATION

BACKGROUND

1. Technical Field

The present disclosure relates generally to conference call sessions, and more particularly to migration from a source conference call session to a target conference call session.

2. Introduction

A conference call originally was an optional feature of a telephone system. The telephone conference call permitted multiple participants to join a single telephone conference. More recently conference call sessions have included combinations of various kinds of media such as audio, video, text, and computer graphics.

Presently there are numerous and diverse computer application programs for scheduling a conference call session, reminding participants of an upcoming conference call session, controlling access of participants to the conference call session, and adding or removing various media streams to the conference call session. The computer application programs range from rather simple client conferencing programs residing on a participant's smart phone or portable computer, to rather complex programs residing on a server at an Internet site of a conference call service provider. The Internet enabled conference call services include the IBM Corporation LOTUSLIVE ENGAGE online collaboration service, the Citrix Systems Inc. GOTOMEETING online collaboration service, the Google Inc GOOGLE WAVE online collaboration service, and the Cisco Systems, Inc. WEBEX online collaboration service.

The proliferation of conference call services with diverse features and levels of complexity has raised challenges of inter-operability among devices and confusion among the human participants. One attempt to address this problem is the promulgation of industry standards governing conference call features and service protocols, with the hope that conference service providers will offer a variety of standard features to suit the needs of most participants. For example, an Internet Engineering Task Force (IETF) set of specifications for centralized conference control (XCON) define protocols for manipulation of conference objects, supporting features including floor control, security, user preferences, and media controls. Several open source implementations have been reported including the CONFerencing IMS-enabled Architecture for Next-generation Communication Experience (CONFIANCE), an implementation for an Instant Messaging Service (IMS).

In reality, in the middle of a current conference call session, the participants often find that the capabilities of the current conference call service are so limited that one or more of the participants will manually configure and initiate a new conference call session using a different conference call service. In most cases, the different conference call services use separate signaling and control protocols for controlling the media, so that the new conference call session derives no benefit from the current conference call session. Consequently, the current conference call session is interrupted by the participants spending considerable time and effort in manually configuring and initiating the new conference call session.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In accordance with one aspect, the invention provides a method of conference call session migration. The method includes a data processor executing computer instructions stored on a non-transitory computer readable storage medium to perform the steps of: (a) automatically configuring and establishing a target conference call session during a source conference call session; (b) automatically converting session state and session history from a source format of the source conference call session to a target format of the target conference call session; and (c) automatically connecting per-user clients to the target conference call session.

In accordance with another aspect, the invention provides a system for conference call session migration. The system includes a data processor coupled to a non-transitory computer readable storage medium storing computer instructions that when executed by the data processor perform the steps of: (a) automatically configuring and establishing a target conference call session during a source conference call session; (b) automatically converting session state and session history from a source format of the source conference call session to a target format of the target conference call session; and (c) automatically connecting per-user clients to the target conference call session.

In accordance with yet another aspect, the invention provides a non-transitory computer-readable storage medium. The non-transitory computer-readable storage medium stores computer instructions that, when executed by a data processor, perform conference call session migration by the steps of: (a) automatically configuring and establishing a target conference call session during a source conference call session; (b) automatically converting session state and session history from a source format of the source conference call session to a target format of the target conference call session; and (c) automatically connecting per-user clients to the target conference call session.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses a need in the art for automatic conference call session migration. Following is a brief introduction of the conference call environment and general purpose computing devices used as clients and servers in the conference call environment. A more detailed description of automatic conference call session migration will then follow.

Figure 1:
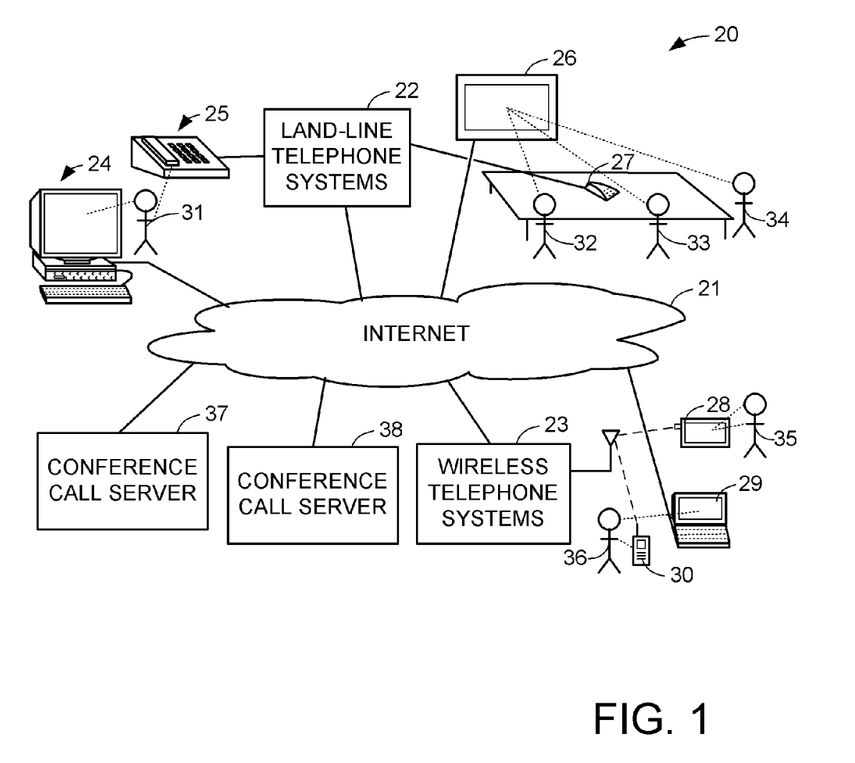
FIG. 1 illustrates a world-wide community of human users and clients and servers linked by the Internet to conduct conference call sessions using diverse devices, media, and conference call application programs supported by various conference call service providers.

With reference to FIG. 1, the conference call environment 20 includes the Internet 21, land-line telephone systems 22, and wireless telephone systems 23 linking various electronic devices 24, 25, 26, 27, 28, 29, 30 operated by human users 31, 32, 33, 34, 35, 36. The electronic devices include a desk-top office computer 24, a desk-top office telephone 25, a conference room video display 26, a conference room conference phone 27, a portable wireless tablet computer 28, a portable laptop computer 29, and a wireless smart phone 30.

The conference call environment 20 permits multiple human users 31, 32, 33, 34, 35, 36 to participate simultaneously or concurrently in a single conference call session using a selected combination of various kinds of media such as audio, video, text, and computer graphics. In addition, the conference call environment 20 includes numerous computer application programs for scheduling a conference call session, reminding participants of an upcoming conference call session, controlling access of participants to the conference call session, and adding or removing various media streams to the conference call session. The computer applications range from rather simple client conferencing programs residing on a smart phone 30 or personal computer 24, 28, 29, to rather complex programs residing on conference call servers 37, 38 at the Internet sites of conference call service providers.

In the conference call environment 20, a problem often arises during a current conference call session due to the limitations of a particular conference call service or due to temporary network congestion or hardware or software failures. The human users participating in the current conference call session will be referred to as the participants of the current conference call session. Due to one or more of these circumstances, the capabilities of the current call session become so inadequate that it becomes desirable to address this problem by initiating a new conference call session and joining at least some of the current call participants in the new conference call session. This process of initiating the new conference call session during the current conference call session and joining at least some of the current call participants in the new conference call session will be referred to as a process of migration from a source conference call session (i.e., the current conference call session) to a target conference call session (i.e., the new conference call session).

The migration from the source conference call session to the target conference call session has often involved considerable disruption of the source conference call session while the participant responsible for managing the source conference call session initiates the target conference call session and joins the participants to the target conference call session. This has involved considerable time and manual effort.

For example, some conference call services have limitations on the media that can be added during a current conference call session, so that a new conference call session must be initiated if it is desired to add new media. In most cases, conference media are controlled by separate signaling and control services, so that the signaling and control services for the new conference call session do not have access to the setup information that was used for the current conference call session. Therefore, the session manager must manually provide this setup information when initiating the new conference call session. In this case, the existing session history and the current context are not migrated to the new conference call session.

For example, adding web conferencing to an audio conference to include a web conference has required that the session manager of the audio conference must separately initiate the web conference. Typically, this means an out-of-band communication of the connection information to the other participants, who then typically select a link to reach the web conference website.

The conference call system should require only a single request, such as "one-click," to add all participants on a conference call to new media sessions, for example audio=>web+audio
audio=>video+audio
audio=>IM
IM=>audio A number of issues should be addressed to reduce distraction or disruption during conference call migration. The conference call session should recognize that the participants may use different devices for different media, for example a phone for audio and a personal computer (PC) for web browsing. The association between participants and devices may not be known a priori. Finding the right device and user address may be policy driven, and may depend on the current location of user. A user may desire to opt-in or opt-out of migration to a new conference call session for addition of a new media or substitution of a different device or transmission channel or conference call service provider for the new media. In some cases, migration may complicate the retention of session history and a session recording from previous media during upward or downward migration.

Figure 2:
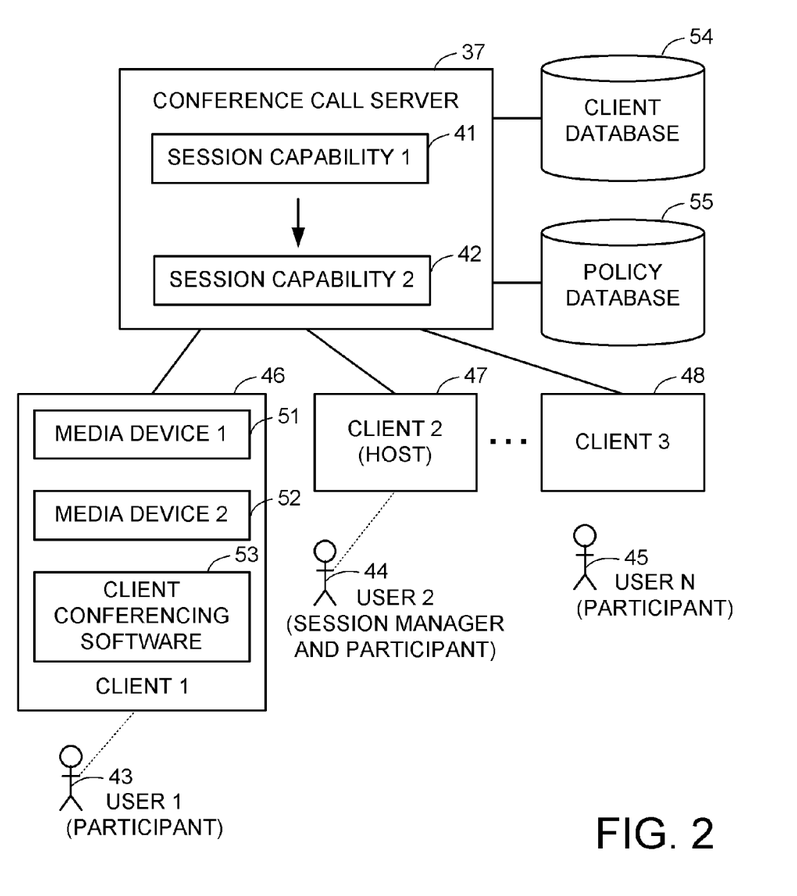
FIG. 2 illustrates a general session migration model in which a conference call server conducting a source conference call session may automatically perform conference call migration to establish a target conference call session.

FIG. 2 illustrates a general session migration model in which a conference call server 37 conducting a source conference call session may automatically perform conference call migration to establish a target conference call session. In a preferred implementation, the conference call server is made by programming a general purpose computer device as shown and further described below with respect to FIG. 3.

As shown in FIG. 2, the conference call server 37 is programmed to provide a first session capability 41 of the source conference call session, and the conference call migration is performed to add a second session capability 42. The conference call server 37 services a number of human users 43, 44, 45, who may be participants or session managers of the source conference call session or the target conference call session. Each human user has an associated set of hardware and software instrumentalities acting as a client 46, 47, 48 with respect to the conference call server 37. With respect to conference call sessions, the pertinent components of a client include media devices 51, 52 and client conferencing software 53.

The conference call server 37 has a client database 54 storing information identifying the network addresses, capabilities, and associated users of the media devices and client conferencing software of each of the clients, and also the preferences of the associated users. The conference call server 37 also has a policy database 55 storing policies for selecting and configuring the user devices and conferencing software for conference call sessions based upon the user preferences and information about the user devices and conferencing software in the client database 54.

Figure 3:
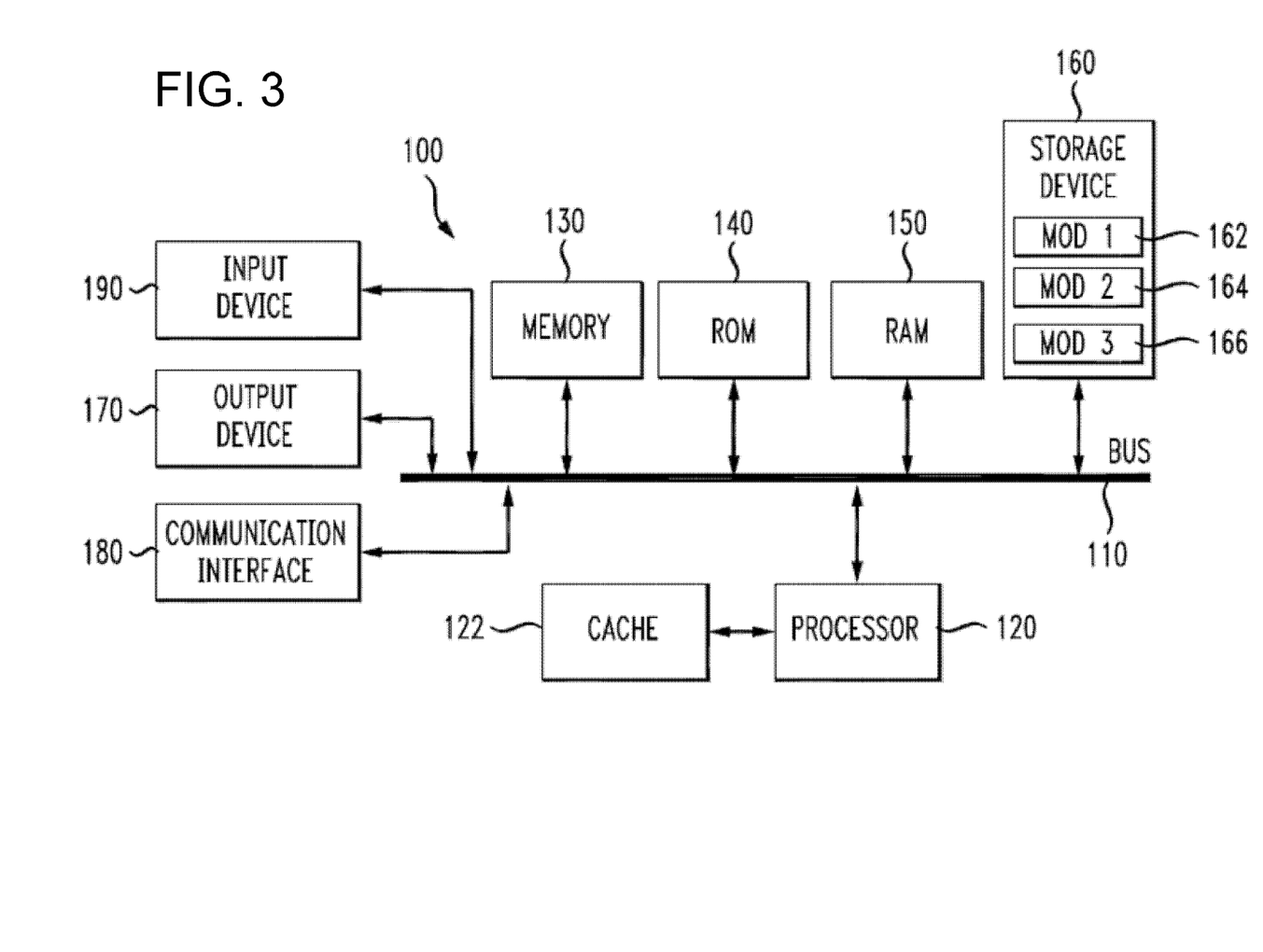
FIG. 3 illustrates components of a client or server including a data processor and a non-transitory computer-readable storage medium containing computer program instructions executed by the data processor.

FIG. 3 shows components of a general-purpose computing device 100 that can be used as a client device or as a server in the conferencing environment of FIG. 1. The general purpose computing device 100 in FIG. 3 includes a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 3 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 3 illustrates three modules Mod1 162, Mod2 164 and Mod3 166, which are modules configured to control the processor 120. These modules may be stored on the storage device 160 and loaded into RAM 150 or memory 130 at runtime or may be stored as would be known in the art in other computer-readable memory locations.

Figure 4:
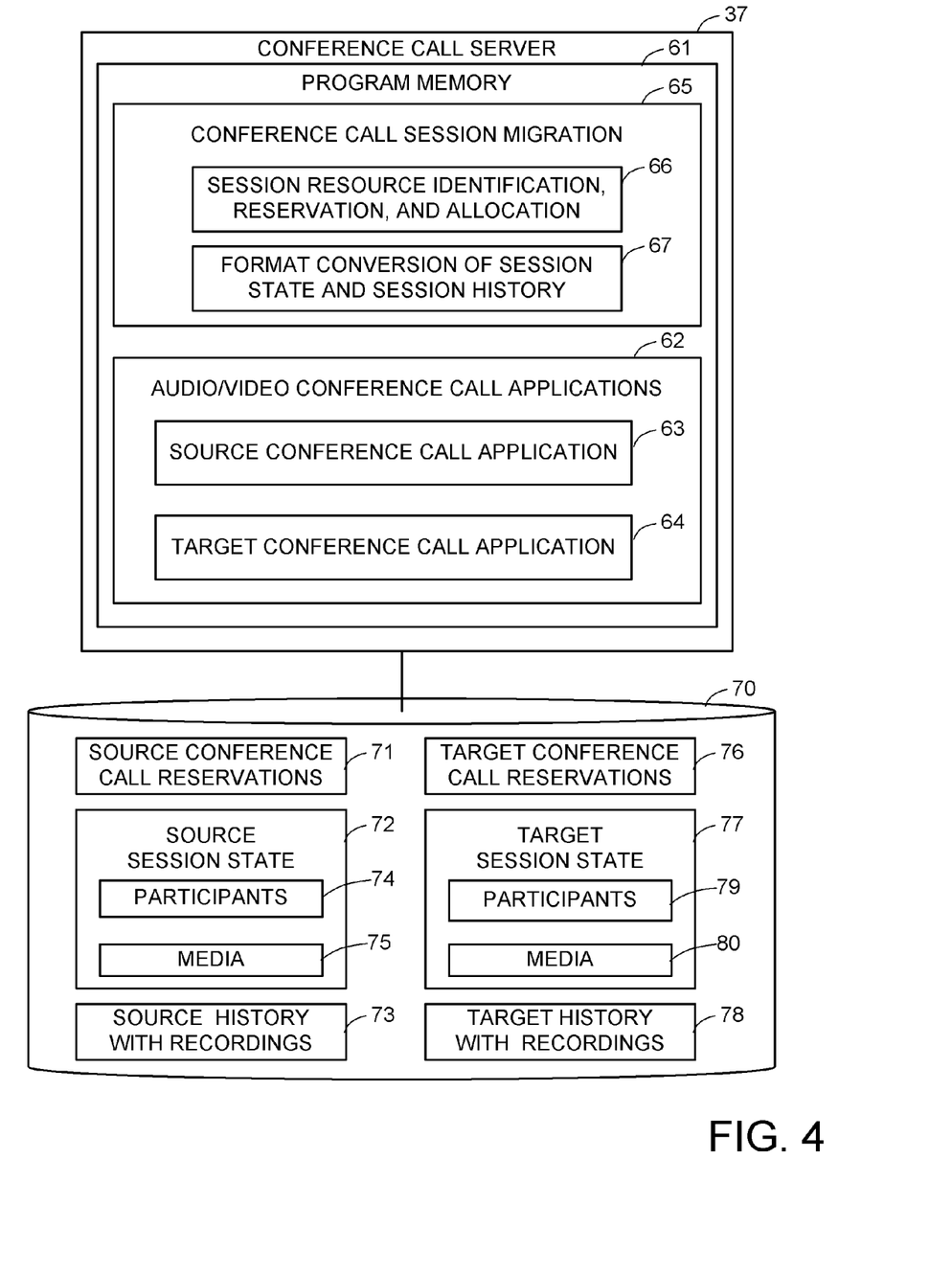
FIG. 4 illustrates a first system embodiment in which a single conference call server contains a conference call session migration program, a source conference call application, and a target conference call application.

Having disclosed some components of a general purpose computing device, the disclosure now turns to FIG. 4, which illustrates programs and data structures in the conference call server 37 for an implementation in which the conference call server 37 includes a program memory 61 storing audio/video conference call applications including both a source conference call application 63 and a target conference call application 64 in addition to a conference call session migration program 65.

The conference call applications 63 and 64 maintain respective data structures in data storage 70 of the conference call server 37. The source conference call application 63 maintains source conference call reservations 71, source session state 72, and source history with recordings 73. The source session state 72 includes information about the participants 74 and the media 75 of the source conference call session. In a similar fashion, the target conference call application 64 maintains target conference call reservations 76, target session state 77, and target history with recordings 78. The target session state 77 includes information about the participants 79 and the media 80 of the target conference call session.

In operation, the source conference call application 63 is initially invoked by a human user acting as a session manager to set up a reservation for the source conference call. The reservation, for example, includes the time at which the conference call begins, the duration of the conference call, the invited participants of the conference call, and the media of the conference call. The reservation process may include checking the availability of the invited participants and ensuring that the invited participants have the devices and conferencing software needed for supporting the media of the conference call. The source conference reservations 71 can be used to send reminders of the conference call shortly in advance of the conference call to the invited participants. The source conference call application 63 may consult the client database (54 in FIG. 2) to obtain preferred methods, client device addresses, and identification of client software for sending invitations and reminders of the source conference call to the desired participants.

At the beginning time of the source conference call session, as indicated in the source conference call reservations, the source conference call application invokes a source session control routine to initiate the source conference call session by connecting the per-user clients of the desired participants to the source conference call session. This connection process includes end-to-end mutual authentication and establishment of connections between network endpoints and client software for the media streams of the source conference call session.

During the source conference call, the conference call server 37 receives a migration request from a session manager or host for the current session. The migration request specifies a source conference call session and a target conference call session. The conference call server 37 responds to this request by invoking execution of the conference call session migration program 65. Execution of the conference call session migration program 65 includes execution of a routine 66 for identifying, reserving, and allocating server, network, and client resources for the target conference call session. This process 66 may take into consideration that the target conference call session may share certain resources with the source conference call session or the target conference call session may use certain resources that become released from the source conference call session upon establishment of the target conference call session. This process 66 of identifying, reserving, and allocating resources may involve negotiating with the participants of the source conference call session to determine whether or not any of these participants will opt-in or opt-out of the target conference call session. The process 66 may involve a distributed two-phase commit protocol in an attempt to reserve client resources at diverse locations, and after receiving confirmation or not from clients at the diverse locations, deciding either to commit to the invocation of the target conference call session, or to abort the reservation of the client resources and to deny the request to migrate to the target conference call session. In any event, if the conference call session migration program decides to commit to the invocation of the target conference call session, then it is likely that invocation of the target conference call application will be successful in establishing the target conference call session with the desired participants due the process 66 of session resource identification, reservation, and allocation for the target conference call session When invoking the target conference call application 64, the execution of the conference call session migration program 65 also supplies to the target conference call application 64 session state from the source conference call session so that there is a seamless transition to the target conference call session. In a preferred implementation, execution of the conference call session migration program 65 also supplies to the target conference call application 64 session history of the source conference call session so that the session history of the target conference call session will include the session history of the source conference call session. For example, the session history includes an identification of the participants that actually joined in the conference call session and the time at which each participant joined.

The session history 73, 78 may also include a recording of audio, video, text, or documents distributed to the participants during the conference call session, and appropriate timestamps so that it is possible to identify the media content that was actually presented to each participant during the conference call session. In general, the target conference call application will use a format for session state and session history that is different from the format and session state used by the source conference call application. Therefore the conference call session migration program 65 has a format conversion routine 67 for conversion of the format of session state 72 and session history 74 used by the source conference call application 63 to the format of session state 77 and session history 78 used by the target conference call application 64.

The format conversion routine 67 may convert the format of the recordings from the format of the source conference call application to the format of the target conference call format and present the format converted source conference call recording to the target conference call application 64 so that the target conference call application appends the recording during the target conference call session to the format converted source conference call recording to provide an integrated seamless recording of the source conference call session together with the target conference call session in a single file.

Figure 5:
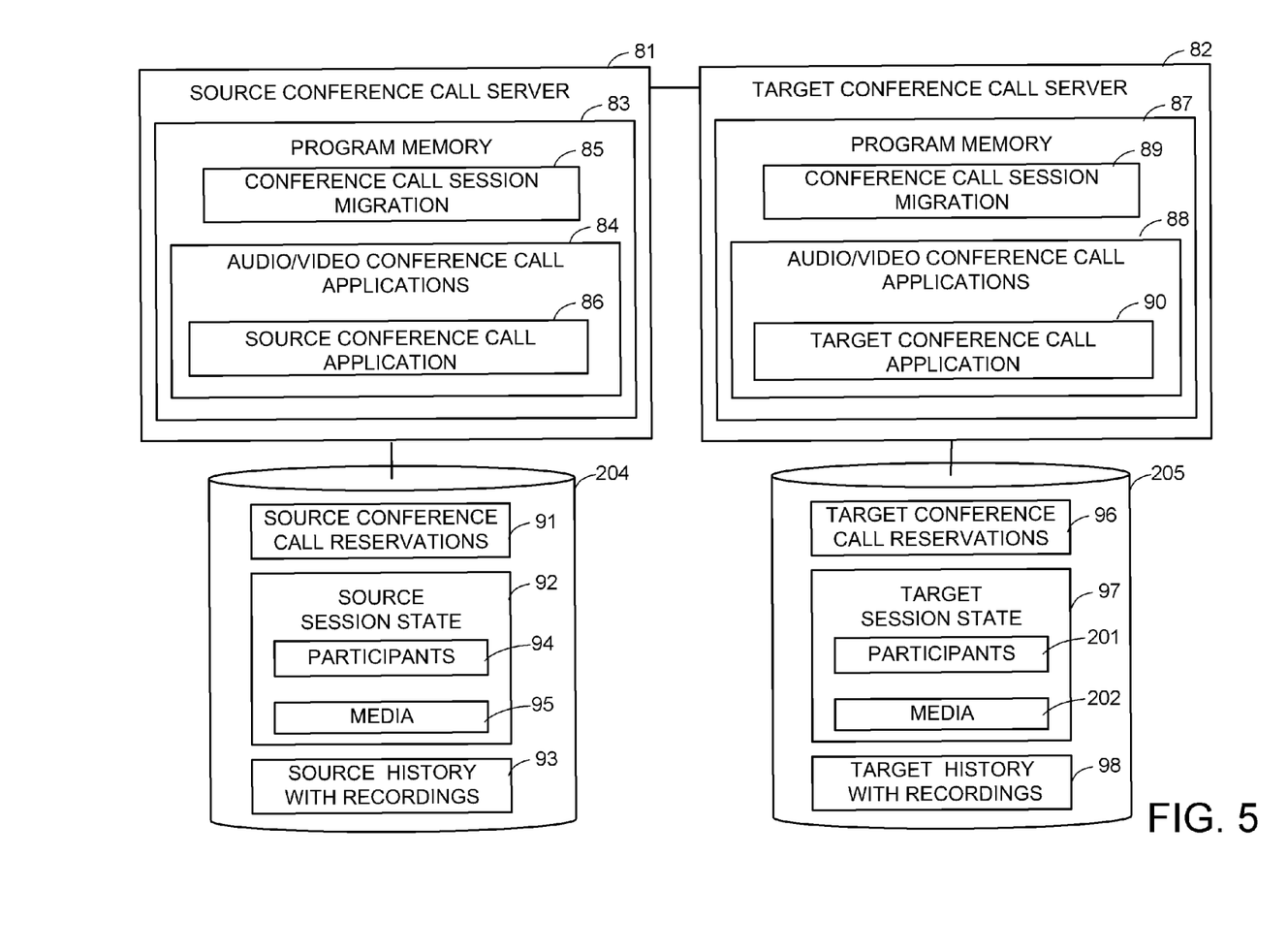
FIG. 5 illustrates a second system embodiment in which a first conference call server contains a conference call session migration program and a source conference call application program, and a second conference call server contains a conference call session migration program and a target conference call application program.

FIG. 5 illustrates a system in which the conference call application 86 for the source conference call session and the conference call application 90 for the target conference call session reside in difference conference call servers 81, 82. This would occur for the case in which the source conference call session and the target conference call session are controlled by different conference call service providers having respective conference call servers.

The source conference call server 81 includes program memory 83 storing audio/video conference call applications 84 and a conference call session migration program 85. The conference call applications 84 include the source conference call application 86. The source conference call server 81 has data storage 204 storing source conference call reservations 91, source session state 92, and source history with recordings 93. The source session state includes information 94 about the participants joined in the source conference call session and information 95 about the media streams of the source conference call session.

The target conference call server 82 includes program memory 87 storing audio/video conference call applications 88 and a conference call session migration program 89. The conference call applications 88 include the target conference call application 90. The target conference call server 82 has data storage 205 storing target conference call reservations 96, target session state 97, and target history with recordings 98. The target session state 97 includes information 201 about the participants joined in the target conference call session and information 202 about the media streams of the target conference call session.

Session migration in the system of FIG. 5 may occur in a fashion similar to the session migration in the system of FIG. 4, in which the conference call session migration program 85 in the source conference call server 81 performs the migration steps described above with respect to the migration program 65 in FIG. 4.

In the system of FIG. 5, it may also be desirable for both the conference call session migration program 85 in the source conference call server 81 and the conference call session migration program 89 in the target conference call server 82 to perform the migration steps for migrating from the source conference call session to the target conference call session. This may be desirable to use an intermediate format for conversion of session state and session history from the source conference call session to the target conference call session. Use of an intermediate format would permit conversion of the source format of session state and session history to the target format of the session state and session history without disclosure of the source format to the conference call service provider of the target conference call session, and without disclosure of the target format to the conference call service provider of the source conference call session. Use of an intermediate industry standard format for the session state and session history would also facilitate format conversion between multiple formats. In this case, the conference call session migration program 85 in the source conference call session server 81 would convert session state and session history between the format of the source conference call session and the industry standard format, and the conference call session migration program 89 in the target conference call server 82 would convert session state and session history between the industry standard format and the format of the target conference call session.

Figure 6:
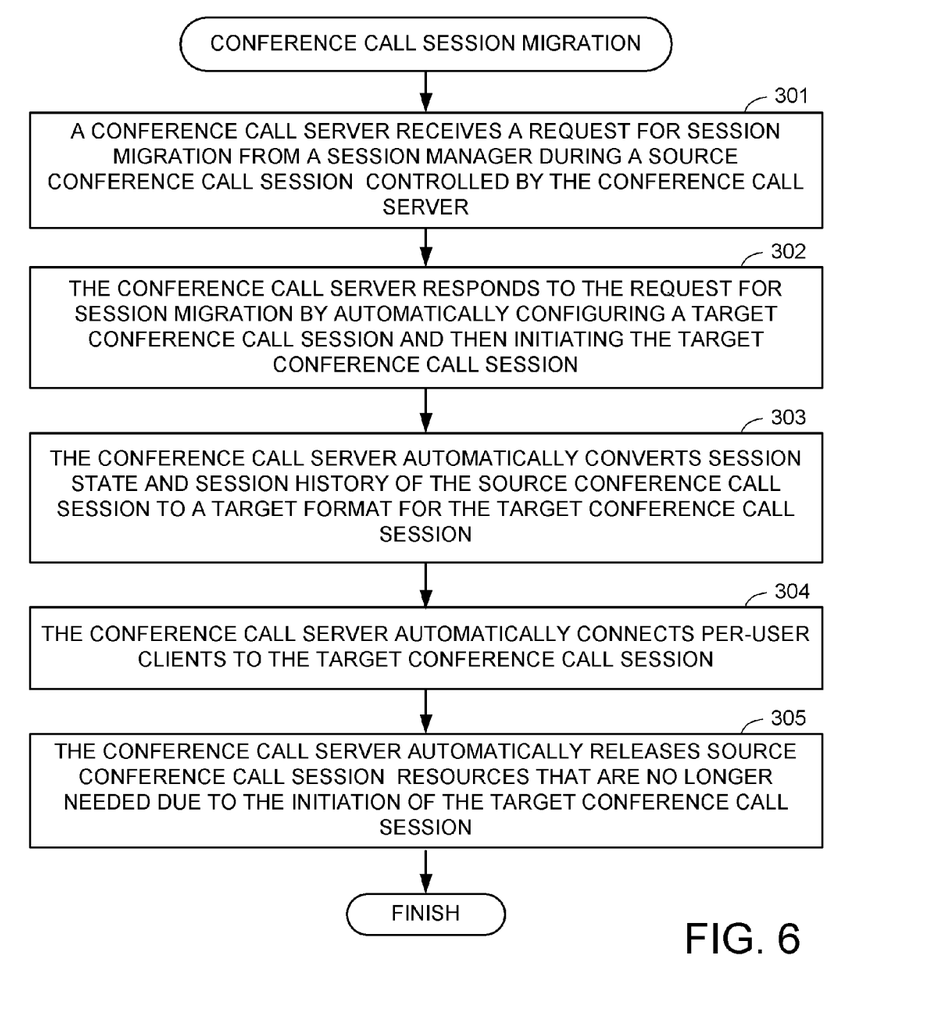
FIG. 6 illustrates an example method embodiment of conference call session migration.

FIG. 6 illustrates an example method embodiment of conference call session migration. The steps outlined herein are exemplary and can be implemented in any combination thereof, including combinations that exclude, add, or modify certain steps. In a first step 301, a conference call server receives a request for session migration from a session manager during a source conference call session controlled by the conference call server. In step 302, the conference call server responds to the request for session migration by automatically configuring a target conference call session and then initiating the target conference call session. In step 303, the conference call server automatically converts session state and session history of the source conference call session to a target format to the target conference call session. In step 304, the conference call server automatically connects per-user clients to the target conference call session. Finally, in step 305, the conference call server automatically releases source conference call session resources that are no longer needed due to the initiation of the target conference call session.

Figure 7:
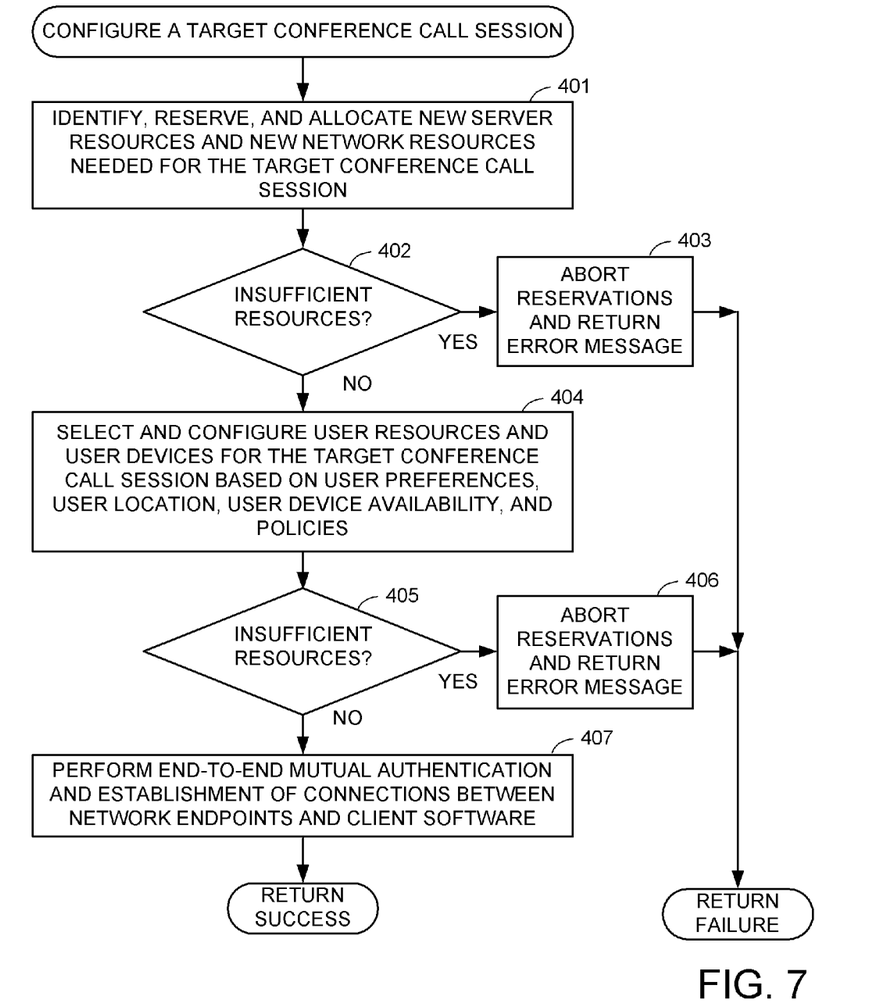
FIG. 7 illustrates details of configuring a target conference call session.

FIG. 7 shows a subroutine for configuring a target conference call session. The subroutine of FIG. 7, for example, is called in step 302 of FIG. 6. In a first step 401 of FIG. 7, the conference call server identifies, reserves, and allocates new server resources and new network resources needed for the target conference call session. In step 402, if there are insufficient server resources and network resources for supporting the target conference call session, then execution branches from step 402 to step 403. In step 403, any reservations made in step 401 are aborted, and execution returns with an error message indicating a failure to configure the target conference call session.

In step 402, if sufficient server and network resources were identified, reserved, and allocated in step 401, then execution continues from step 402 to step 404. In step 404, the conference call server selects and configures user resources and user devices for the target conference call session based on user preferences, user location, user device availability, and policies. In step 405, if there are insufficient user resources for supporting the target conference call session, then execution branches from step 405 to step 406 to abort any reservations and allocations made in step 401 and 404, and execution returns with an error message indicating a failure to configure the target conference call session.

In step 405, if sufficient user resources were found in step 404, then execution continues from step 405 to step 407. In step 407, the conference call server performs end-to-end mutual authentication and establishment of connections between network endpoints and client software, and then execution returns indicating successful configuration of the target conference call session.

Figure 8:
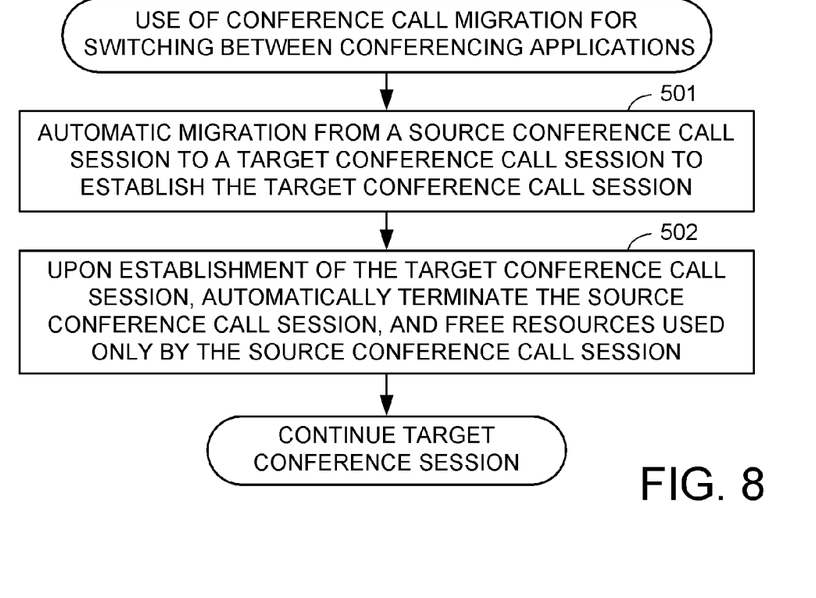
FIG. 8 illustrates use of conference call migration for switching between conferencing applications.

FIG. 8 illustrates use of conference call migration for switching between conferencing applications. In a first step 501, a conference call server performs automatic migration from a source conference call session to a target conference call session, for example as described above with respect to FIGS. 6 and 7. Then, in a final step 502, upon establishment of the target conference call session, the conference call server automatically terminates the source conference call session, and frees server, network, and client resources used only by the source conference call session.

Figure 9:
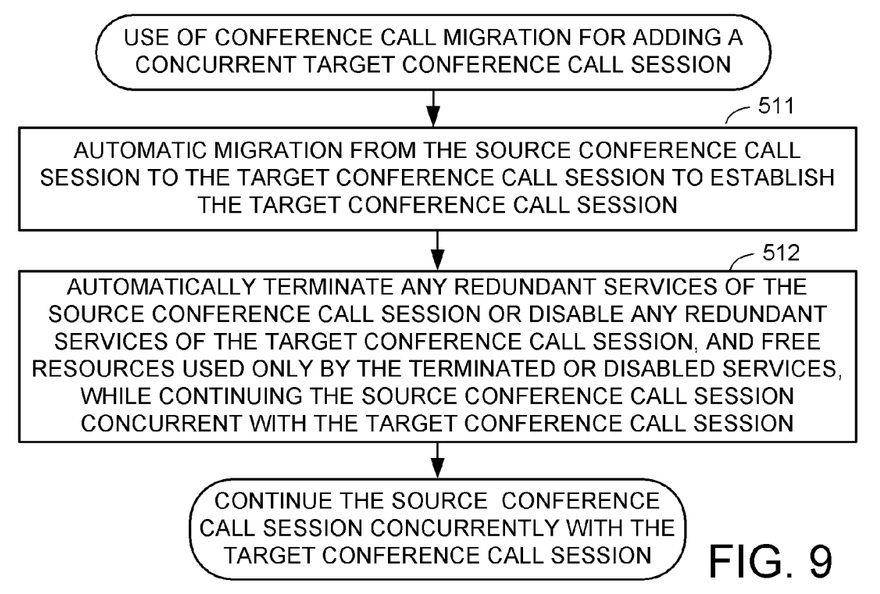
FIG. 9 illustrates use of conference call migration for adding a concurrent target conference call session to a continuing source conference call session.

FIG. 9 illustrates use of conference call migration for adding a concurrent target conference call session to a continuing source conference call session. In a first step 511, a conference call server performs automatic migration from a source conference call session to a target conference call session, for example as described above with respect to FIGS. 6 and 7. Then, in a final step 512, upon establishment of the target conference call session, the conference call server automatically terminates any redundant services of the source conference call session or disables any redundant services of the target conference call session, and frees resources used only by the terminated or disabled services, while continuing the source conference call session concurrent with the target conference call session.

For example, some web conferencing applications use a microphone and speakers in a laptop or desktop computer for voice communication between participants. Network congestion may cause the data transmission rate over the web connection to drop below a certain threshold, such as 20 kilobits per second, required for high-quality voice communication. In this instance, the session manager of the web conference may invoke automatic migration to add a telephone conference call over the land-line telephone system. In this case, upon establishment of the target conference call session over the land-line telephone system, the web conference call is continued concurrent with the new telephone conference call but the voice communication over the Internet connection is discontinued so that the limited network bandwidth resources of the Internet connection are no longer used for voice communication over the Internet connection and instead can be used for transmission of text, computer graphics, or files in accordance with the protocol of the source conference call session.

Figure 10:
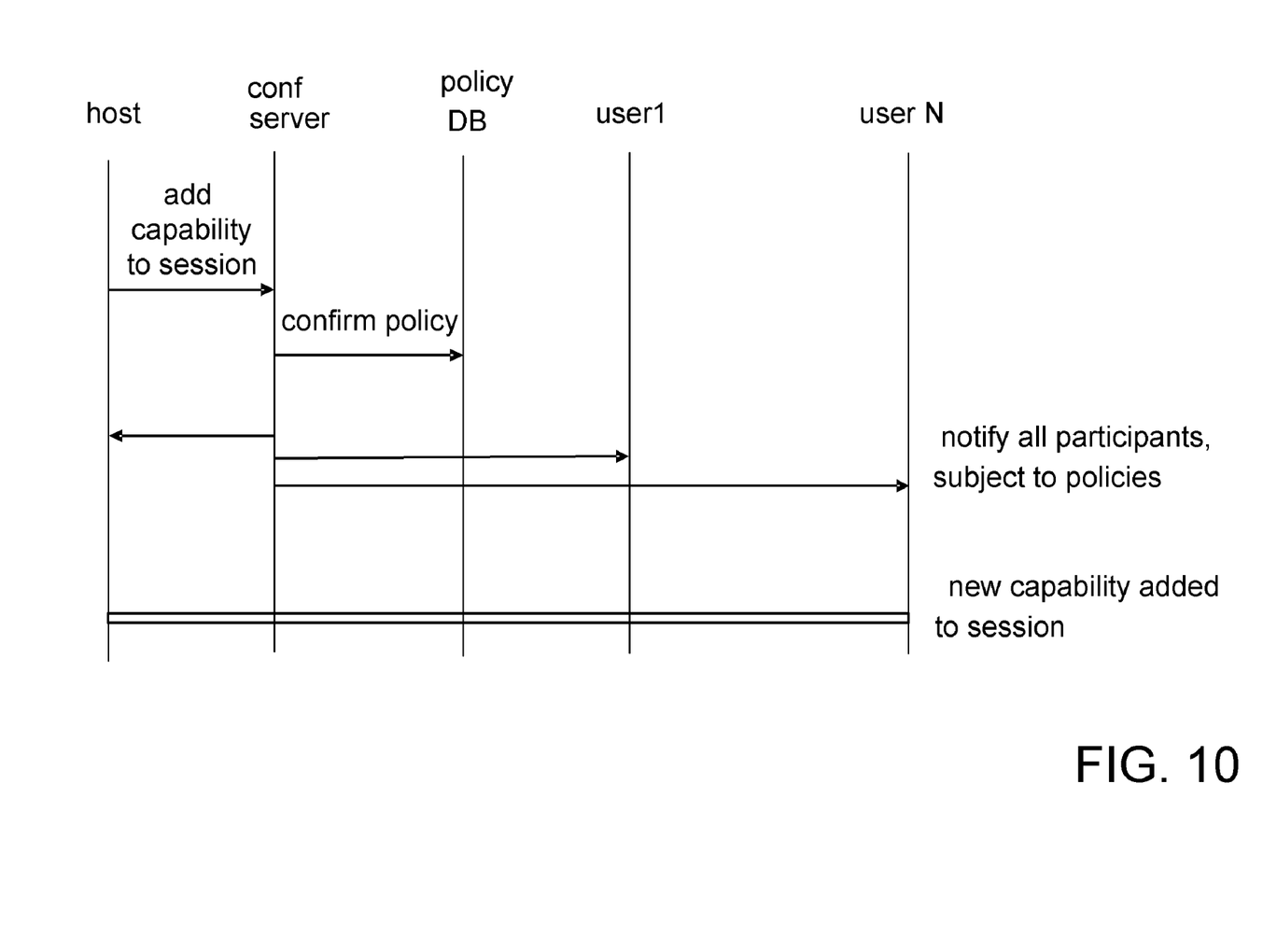
FIG. 10 illustrates details of host controlled signaling during conference call session migration.

FIG. 10 illustrates details of host controlled signaling during conference call session migration to permit participants to op-in or opt-out of a target conference call session. A host, such as the client of the manager of a source conference call session, sends a migration request to the conference call server of the source conference call session in order to add a capability to the source conference call session. The conference call server accesses the policy database to determine the policy to follow for selecting and configuring the user devices and conferencing software for the target conference session based upon the user preferences and information about the user devices and conferencing software in the user database for the participants of the source conference call session. The policy may specify that if all of the participants do not have devices or software for supporting the target conference session, then a message is sent back to the host identifying the participants that do not have devices or software for supporting the target conference session, and the degree of impairment of these participants with respect to the target conference session, and requesting the host to confirm that migration should proceed under these circumstances. If the migration to the target conference session will not be transparent to all of the participants, then the policies may cause all affected participants subject to the policies to be notified of the impending migration, and possibly offering a veto capability to certain participants. Subject to the policies, the new capability is added to the system by migrating to the target conference session.

Figure 11:
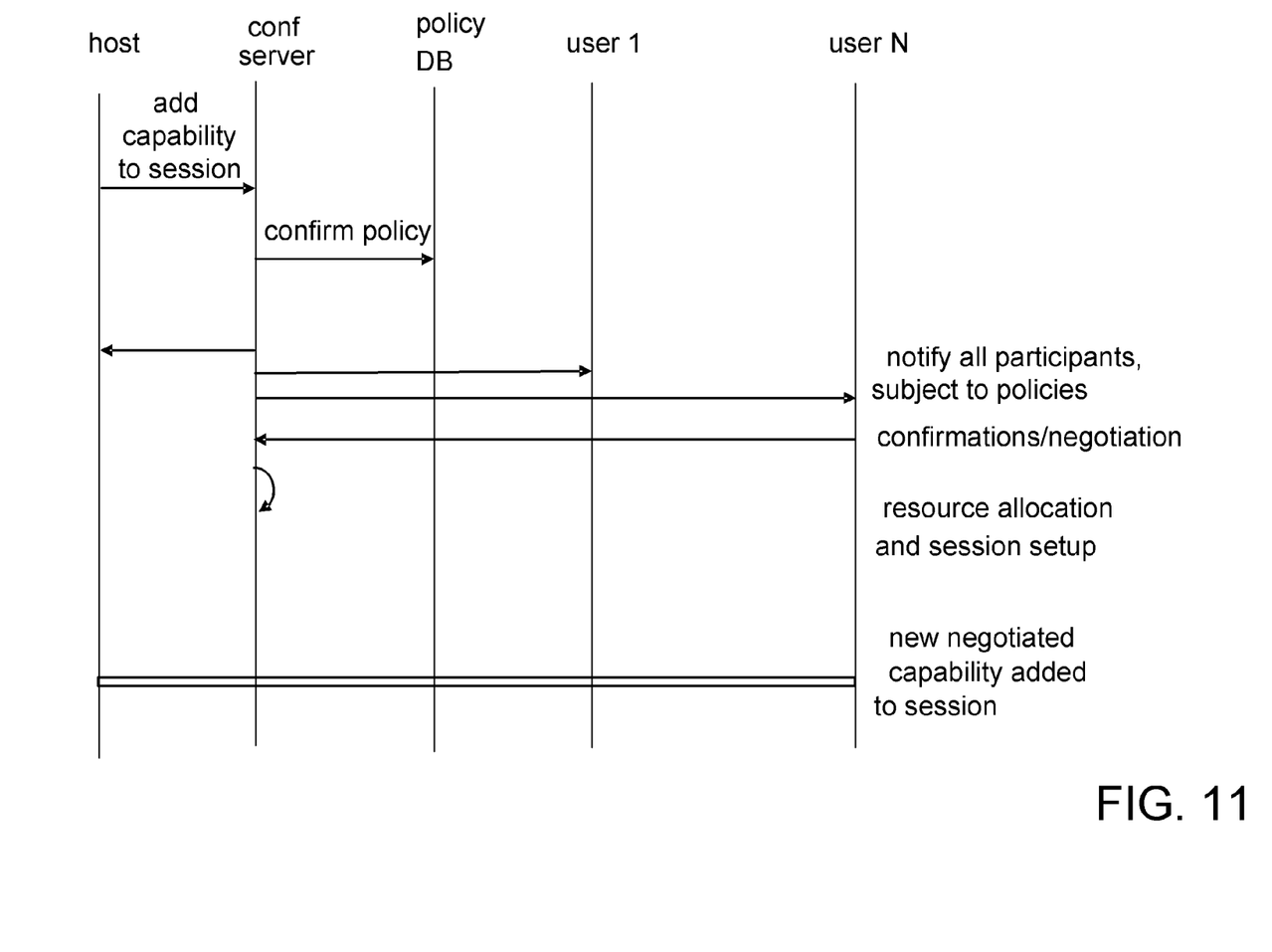
FIG. 11 illustrates further details of host controlled signaling with participant confirmation and/or negotiation.

For example, FIG. 11 illustrates host controlled signaling with participant confirmation and/or negotiation. In this case, after notifying all affected participants subject to the policies, the conference call server controlling the source conference call session waits for confirmations from the affected participants, or negotiates with affected participants that do not confirm that the migration would be acceptable. Subject to the policies for confirmation and negotiation, the conference call server allocates resources and sets up the target conference call session, and adds new negotiated capability to the current session by migrating to the target conference call session. Thus, subject to the outcome of the negotiation, some participants may use the new negotiated capability of the target conference call session, and other participants may continue using the old capability of the source conference call session concurrent with the target conference call session.

Following are some specific examples using the method and system as described above. In a first example, several users are in an audio-conference call from desktop phones. During the call, they want to discuss a document via a web interface. The conference manager selects "add web conference". The conference call server determines which web-capable devices are available for which users, depending on their location, preferences, company policies, and media compatibility. The conference call server allocates necessary resources at the web conference server, auto-initializes the client software for each user's device such that each user can now access the web conference. If auto-authentication is supported by policies and credentials, then the session authentication steps for the original connection are applied to the web conference. Otherwise, one or more participants provide the necessary credentials.

In a second example, several users are again in an audio-conference call from desktop phones, and during the call, they want to discuss a document via a web interface. In this second example, at least one user has a preference to use a softphone for audio when the web conference is initiated. Then the conference call server configures and initiates a dial-out or call forwarding to the participant's softphone. When that endpoint is answered, the call leg for the original device is terminated. The user's new endpoint is automatically reflected in the participant list.

In a third example, during the web conference of the previous example, the participants decide to switch to a GOOGLE-WAVE collaboration session so that they can blog about the web presentation material in a wave. The conference call server performs the usual session migration steps. In addition, session history from the audio-bridge (including a recording of the telephone conference call) and the web conference (also recorded) is converted into a series of wave-lets and blips and persisted in the wave. The participants are connected into the wave and can continue talking and blogging in the wave.

In the above examples, the method of conference call migration enables "one-click" addition of new media in the middle of a source conference call session regardless of whether the source conference call session is managed by a conference call server that already supports the new media. In addition, the semantic information of the source conference call session is transferred to the new target conference call session by the conversion of the session state and session history of the source conference call session to the target conference call session.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure Those skilled in the art will readily recognize various modifications and changes that may be made to the principles described herein without following the example embodiments and applications illustrated and described herein, and without departing from the spirit and scope of the disclosure.

We claim:

1. A method of conference call session migration, the method comprising a data processor executing computer instructions stored on a non-transitory computer readable storage medium to perform the steps of:
    (a) automatically configuring and establishing a target conference call session during a source conference call session;
    (b) automatically converting session state and session history from a source format of the source conference call session to a target format of the target conference call session; and
    (c) automatically connecting per-user clients to the target conference call session.

2. The method as claimed in claim 1, wherein the data processor is in a conference control server, and the method further includes the conference control server controlling the source conference call session, and while the conference control server is controlling the source conference call session, the conference control server receiving a request for conference call session migration from a session manager of the source conference call session, and then performing the steps (a), (b), and (c) in response to the conference control server receiving the request for session migration from the session manager of the source conference call session.

3. The method as claimed in claim 1, wherein the step (a) of automatically configuring and establishing the target conference call session during the source conference call session includes:
    identifying, reserving, and allocating new server resources and new network resources for the target conference call session; and
    selecting and configuring user resources and user devices for the target conference call session based on user preferences, user location, user device availability, and policies; and
    performing end-to-end mutual authentication and establishment of connections between network endpoints and client software.

4. The method as claimed in claim 1, which further includes the data processor executing computer instructions stored on the non-transitory computer readable storage medium to automatically release source conference call session resources that are no longer needed due to the initiation of the target conference call session.

5. The method as claimed in claim 1, which further includes the data processor executing computer instructions stored on the non-transitory computer readable storage medium to automatically terminate the source conference call session upon establishment of the target conference call session, and to free resources used only by the source conference call session.

6. The method as claimed in claim 1, which further includes the data processor executing computer instructions stored on the non-transitory computer readable storage medium to automatically terminate services of the source conference call session that become redundant upon establishment of the target conference call session, and continuing the source conference call session concurrently with the target conference call session after establishment of the target conference call session.

7. A system for conference call session migration, the system comprising a data processor coupled to a non-transitory computer readable storage medium storing computer instructions that when executed by the data processor perform the steps of:
    (a) automatically configuring and establishing a target conference call session during a source conference call session;
    (b) automatically converting session state and session history from a source format of the source conference call session to a target format of the target conference call session; and
    (c) automatically connecting per-user clients to the target conference call session.

8. The system as claimed in claim 7, further including a conference control server containing the data processor and the non-transitory computer readable storage medium, and wherein the computer instructions, when executed by the data processor, further control the source conference call session, and while controlling the source conference call session, perform the steps (a), (b), and (c) in response to the conference control server receiving a request for session migration from a session manager of the source conference call session.

9. The system as claimed in claim 7, wherein the step (a) of automatically configuring and establishing the target conference call session during the source conference call session includes:
- identifying, reserving, and allocating new server resources and new network resources for the target conference call session; and
- selecting and configuring user resources and user devices for the target conference call session based on user preferences, user location, user device availability, and policies; and
- performing end-to-end mutual authentication and establishment of connections between network endpoints and client software.

10. The system as claimed in claim 7, wherein the computer instructions, when executed by the data processor, further perform the step of automatically releasing source conference call session resources that are no longer needed due to the initiation of the target conference call session.

11. The system as claimed in claim 7, wherein the computer instructions, when executed by the data processor, further perform the steps of automatically terminating the source conference call session upon establishment of the target conference call session, and freeing resources used only by the source conference call session.

12. The system as claimed in claim 7, wherein the computer instructions, when executed by the data processor, further perform the steps of automatically terminating services of the source conference call session that become redundant upon establishment of the target conference call session, and continuing the source conference call session concurrently with the target conference call session after establishment of the target conference call session.

13. The system as claimed in claim 7, further comprising a server containing the data processor and the non-transitory computer readable storage medium, the server further comprising data storage containing a client database and a policy database, the client database storing user preferences and information about user devices and conferencing software, and the policy database storing policies for selecting and configuring the user devices and conferencing software for the target conference call session based upon the user preferences and information about the user devices and conferencing software in the user database.

14. The system as claimed in claim 7, further comprising a first server containing the data processor and the non-transitory computer readable storage medium, the non-transitory computer readable storage medium containing a source conference application program, and the first server including data storage storing source conference reservations, source session state including participants and media of the source conference call session, and source history including a recording of the source conference call session, and the system further comprising a second server containing a target conference application program and data storage storing target conference reservations, target session state including participants and media of the target conference call session, and target history including a recording of the target conference call session.

15. A non-transitory computer-readable storage medium storing computer instructions that, when executed by a data processor, perform conference call session migration by the steps of:
- (a) automatically configuring and establishing a target conference call session during a source conference call session;
- (b) automatically converting session state and session history from a source format of the source conference call session to a target format of the target conference call session; and
- (c) automatically connecting per-user clients to the target conference call session.

16. The non-transitory computer-readable storage medium as claimed in claim 15, wherein steps (a), (b), and (c) are performed in response to a conference control server receiving a request for session migration from a session manager of the source conference call session.

17. The non-transitory computer-readable storage medium as claimed in claim 15, wherein the step (a) of automatically configuring and establishing the target conference call session during the source conference call session includes:
- identifying, reserving, and allocating new server resources and new network resources for the target conference call session; and
- selecting and configuring user resources and user devices for the target conference call session based on user preferences, user location, user device availability, and policies; and
- performing end-to-end mutual authentication and establishment of connections between network endpoints and client software.

18. The non-transitory computer-readable storage medium as claimed in claim 15, wherein the computer instructions, when executed by the data processor, further perform the step of automatically releasing source conference call session resources that are no longer needed due to the initiation of the target conference call session.

19. The non-transitory computer-readable storage medium as claimed in claim 15, wherein the computer instructions, when executed by the data processor, further perform the steps of automatically terminating the source conference call session upon establishment of the target conference call session, and freeing resources used only by the source conference call session.

20. The non-transitory computer-readable storage medium as claimed in claim 15, wherein the computer instructions, when executed by the data processor, further perform the steps of automatically terminating services of the source conference call session that become redundant upon establishment of the target conference call session, and continuing the source conference call session concurrently with the target conference call session after establishment of the target conference call session.

* * * * *